United States Patent [19]

Wada et al.

[11] 4,451,919

[45] May 29, 1984

[54] DIGITAL SIGNAL PROCESSOR FOR USE IN RECORDING AND/OR REPRODUCING EQUIPMENT

[75] Inventors: Ryoichi Wada, Habikino; Mitsuharu Tsuchiya; Takanori Senoo, both of Katano; Kanji Odagi, Neyagawa, all of Japan

[73] Assignee: Matsushita Electric Industrial Co., Ltd., Osaka, Japan

[21] Appl. No.: 355,207

[22] Filed: Mar. 5, 1982

Related U.S. Application Data

[63] Continuation of Ser. No. 97,549, Nov. 26, 1979, abandoned.

[30] Foreign Application Priority Data

Nov. 28, 1978 [JP] Japan .................................. 53-147456

[51] Int. Cl.$^3$ ............................................. G06F 11/10
[52] U.S. Cl. ....................................................... 371/38
[58] Field of Search ..................................... 371/38, 37

[56] References Cited

U.S. PATENT DOCUMENTS

| | | | |
|---|---|---|---|
| Re. 28,923 | 8/1976 | Patel ...................................... | 371/38 |
| 4,030,067 | 6/1977 | Howell et al. ......................... | 371/37 |
| 4,145,683 | 3/1979 | Brookhart ............................. | 371/38 |

OTHER PUBLICATIONS

Mikhail "A Multiple Error Correction System" *IBM Tech. Disclosure Bulletin* vol. 12, No. 11, Apr. 1970, pp. 1886-1888.

Challande "Error-Detecting/Correcting System" *IBM Tech. Disclosure Bulletin*, vol. 19, No. 8, Jan. 1977, pp. 3080-3081.

McCracken "A High-Performance Digital Audio Recorder" *J. of the Audio Engineering Society* Jul./Aug. 1978, vol. 26, No. 7/8, pp. 560-562.

*Primary Examiner*—David H. Malzahn
*Attorney, Agent, or Firm*—Wenderoth, Lind & Ponack

[57] ABSTRACT

A digital signal processor for recording an analog signal in the form of a PCM signal and/or for reproducing the PCM signal in the form of an analog signal. It has functions of generating a first and a second check code each by performing a modulo 2 operation and of adding a third check code to each of the first and the second check codes for detecting errors. The original signals can thereby be restored completely, even when up to two data sets have been subjected to errors.

2 Claims, 8 Drawing Figures

DIGITAL SIGNAL PROCESSOR FOR USE IN RECORDING AND/OR REPRODUCING EQUIPMENT

This is a continuation of application Ser. No. 97,549, filed Nov. 26, 1979, now abandoned.

BACKGROUND OF THE INVENTION

This invention relates to a digital signal processor, and more particularly to recording equipment which records, on magnetic tape or other recording media, an analog signal, such as an audio signal, after converting it into a pulse-code modulation signal (hereafter referred to as a PCM signal). It records in reproducing equipment, which reproduces the original analog signal by converting the PCM signal read out from the recording medium, or in signal processing devices which are used in equipment which has recording and reproducing functions as above (for example, PCM tape recorders, PCM disc recorders/reproducers) in order to enable the faithful recording and reproduction of signals.

When a PCM code recorded in a recording medium is reproduced, the reproduced code is subject to errors due to various causes. On the reproduction side in this case, the data which has been subjected to errors must be corrected.

SUMMARY OF THE INVENTION

It is an object of this invention to provide a digital signal processor which can restore the original signal substantially completely, even when they have been subjected to errors.

This invention enables signal recording equipment, signal reproducing equipment, signal reproducing/recording equipment, or other signal processing equipment to correct errors. It uses a number of sets of data, each of which is composed of G bits (where G is an integer equal to or greater than 2), generating a first check code by the sum of modulo 2 of each bit of sets of sampled data, generating a second check code by modulo 2 operation for each bit of data which is obtained by multiplying each data word by each matrix of G columns and G rows, and adding a third check code to the above data word and the first check code and the second check code for detecting errors. It thus provides a system that can restore the original signal completely, even when up to two data words have been subjected to errors.

BRIEF DESCRIPTION OF THE DRAWINGS

Details of this invention will be apparent upon consideration of the following detailed descriptions taken in conjunction with the accompanying drawings, in which.

DESCRIPTION OF THE PREFERRED EMBODIMENTS

The invention is described here, using an example of its application to a two channel PCM tape recorder and referring to the attached drawings.

With the PCM tape recorder in this example, the signal to be recorded is converted before being recorded into a television signal format. 245H (H: one horizontal line period) are used in one vertical scanning period and the remaining 17.5H are used for the vertical synchronizing signal. The data which can be held by one H are, three for the L (left) channel, and three for the R (right) channel. Thus, the sampling frequency is 44.056 kHz.

The general construction of conventional PCM tape recorders is well known and is not explained in detail here. The generating method of the first check code (hereafter referred to as the P code), which is one of the components of the signal used by this invention, is shown in Table 1. The bits of individual codes are shown in the lower rows of Table 1.

Referring to Table 1, P denotes a P code and $W_1$–$W_6$ denote sampled data words. Bits $P_1$–$P_{14}$ of P code are calculated by modulo 2 operation of respective bits $a_1$–$a_{14}$ of $W_1$, bits $b_1$–$b_{14}$ of $W_2$, bits $c_1$–$c_{14}$ of $W_3$, bits $d_1$–$d_{14}$ of $W_4$, bits $e_1$–$e_{14}$ of $W_5$, and bits $f_1$–$f_{14}$ of $W_6$. For this example equipment, sample data words $W_1$–$W_6$ are composed of 14 bits. Therefore, the P code is also composed of 14 bits. This is expressed by the following formula:

$$P = W_1 \oplus W_2 \oplus W_3 \oplus W_4 \oplus W_5 \oplus W_6 \qquad (1)$$

The second check code (hereafter referred to as the Q code) is obtained through modulo 2 operation by operating matrices $T^6, T^5, T^4, T^3, T^2$ and $T$ on respective sample data words of $W_1$–$W_6$. This is expressed with the following formula:

$$Q = T^6 W_1 \oplus T^5 W_2 \oplus T^4 W_3 \oplus T^3 W_4 \oplus T^2 W_5 \oplus T W_6 \qquad (2)$$

When T matrix is an associated matrix of a polynomial, the matrix is written as follows:

$$T = \begin{pmatrix} 0 & 0 & 0 & 0 & 0 & 0 & 0 & 0 & 0 & 0 & 0 & 0 & 0 & 1 \\ 1 & 0 & 0 & 0 & 0 & 0 & 0 & 0 & 0 & 0 & 0 & 0 & 0 & 0 \\ 0 & 1 & 0 & 0 & 0 & 0 & 0 & 0 & 0 & 0 & 0 & 0 & 0 & 0 \\ 0 & 0 & 1 & 0 & 0 & 0 & 0 & 0 & 0 & 0 & 0 & 0 & 0 & 0 \\ 0 & 0 & 0 & 1 & 0 & 0 & 0 & 0 & 0 & 0 & 0 & 0 & 0 & 0 \\ 0 & 0 & 0 & 0 & 1 & 0 & 0 & 0 & 0 & 0 & 0 & 0 & 0 & 0 \\ 0 & 0 & 0 & 0 & 0 & 1 & 0 & 0 & 0 & 0 & 0 & 0 & 0 & 0 \\ 0 & 0 & 0 & 0 & 0 & 0 & 1 & 0 & 0 & 0 & 0 & 0 & 0 & 0 \\ 0 & 0 & 0 & 0 & 0 & 0 & 0 & 1 & 0 & 0 & 0 & 0 & 0 & 1 \\ 0 & 0 & 0 & 0 & 0 & 0 & 0 & 0 & 1 & 0 & 0 & 0 & 0 & 0 \\ 0 & 0 & 0 & 0 & 0 & 0 & 0 & 0 & 0 & 1 & 0 & 0 & 0 & 0 \\ 0 & 0 & 0 & 0 & 0 & 0 & 0 & 0 & 0 & 0 & 1 & 0 & 0 & 0 \\ 0 & 0 & 0 & 0 & 0 & 0 & 0 & 0 & 0 & 0 & 0 & 1 & 0 & 0 \\ 0 & 0 & 0 & 0 & 0 & 0 & 0 & 0 & 0 & 0 & 0 & 0 & 1 & 0 \end{pmatrix}$$

In this case the bits of the Q code are as shown in Table 2. The parity check matrix for code word $(W_1, W_2, W_3, W_4, W_5, W_6, P, Q)^T$ is expressed as follows:

$$H = {}^T\!\begin{pmatrix} I & I & I & I & I & I & I & 0 \\ T^6 & T^5 & T^4 & T^3 & T^2 & T & 0 \end{pmatrix}$$

Where $A^T$ denotes transposition of A matrix and I denotes a unit matrix.

The sampled data words $W_1$-$W_6$, consisting of 14 bits, and check codes P and Q are located in the recorded signal with spacing D as counted in H-units. Hereafter this process is referred to as interleaving.

Figure 1:
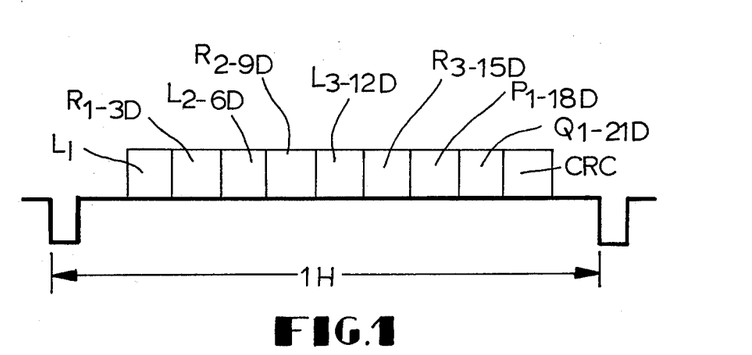
FIG. 1 shows an example of the layout of data in one horizontal line period of a recorded signal.

Construction of the signal positioned in 1H is shown in FIG. 1. In the figure, L and R denote the digitized left signal and right signal. The subscripts indicate the sampling sequence. Therefore, the above-mentioned sampled data words $W_1$-$W_6$ correspond to $L_1, R_1, L_2, R_2, L_3$, and $R_3$ and the P code and Q code accompanying the sample data of the corresponding set are denoted by $P_1$ and $Q_1$.

Figure 2:
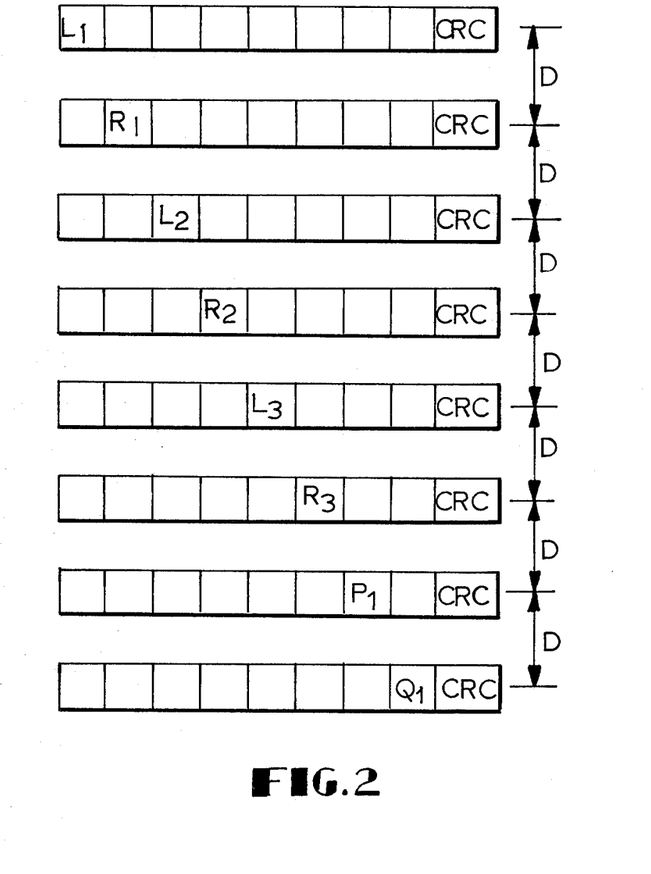
FIG. 2 is for explanation of interleaving.

The data and check codes of the same set are positioned with a spacing of D(H). An example of layout is shown in FIG. 2. Referring to FIG. 2, each section in the lateral direction indicates data in 1H. The third check code is added at the end in order to check whether the data in 1H has been subjected to errors. In this example, a cyclic redundancy check code (hereafter abbreviated as CRC) of 16 bits is used for the third check code. In FIG. 2, CRC at the last part of the data of 1H is the third check code.

A set of data, $L_1, R_1, L_2, R_2, L_3, R_3$, and codes P1 and Q1 are positioned with distance D(H) as shown in FIG. 2. The purpose of the above is to reduce the possibility of occurrence of two or more data errors of the same set due to the same cause. With this example equipment, one set of data (total of data and check codes) comprises 8 words and the data set which is located in 1H is also 8 words. Thus, their numbers of data words conform. Thanks to this conformity, data reproduction can be started at any position. That is to say, regardless of the starting position of reproduction, one set of data is reproduced in the order of the first data of the initial H period, the second data after D(H) period, the third data in the H period after 2D(H) period, and so on. If the numbers did not conform, since the data have certain periodical features, a certain means of identification would be required for the layout of data to reproduce a set of data, and the signal circuit would become complicated.

Figure 3:
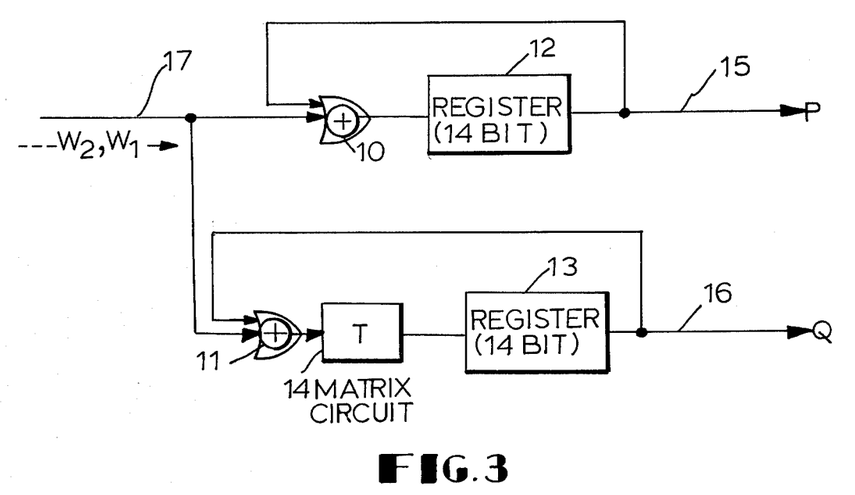
FIG. 3 shows an example of a P and Q code generation circuit which may be used in relation to this invention.

The circuits which generate the P code and Q code are shown in FIG. 3. The P code is the result of modulo 2 operation on each bit of data words $W_1$-$W_6$. Therefore, when the data words are applied sequentially, starting with $W_1$ to input line 17, the input signal and the contents of register 12 are subjected to modulo 2 operation for each bit by the exclusive OR circuit 10 and the result of operation is stored in register 12. If the register is cleared initially, the contents of register 12 become $W_1$, when $W_1$ is input, and the above contents become $W_1 \oplus W_2$ when $W_2$ is input. When words are input up to $W_6$ in a similar manner, contents $R_1$ of shift register 12 become as follows:

$$R_1 = \sum_{i=1}^{6} W_i \tag{3}$$

Where $\Sigma$ denotes modulo 2 addition operation. This data conforms with the above-mentioned P code. The P code is thus produced.

When register 13 is cleared and $W_1$ is input to input line 17 in a similar manner, the data is fed to the register via matrix circuit 14 and the contents of the register become $TW_1$. Next, as $W_2$ is input, the contents of the register become $T(W_2 \oplus TW_1)$ and therefore, when words are input sequentially up to $W_6$, contents $R_2$ of the shift register become as follows:

$$R_2 = \sum_{i=1}^{6} T^{7-i} W_i \tag{4}$$

This data conforms with the Q code. Thus a Q code is created in register 13.

Figure 4:
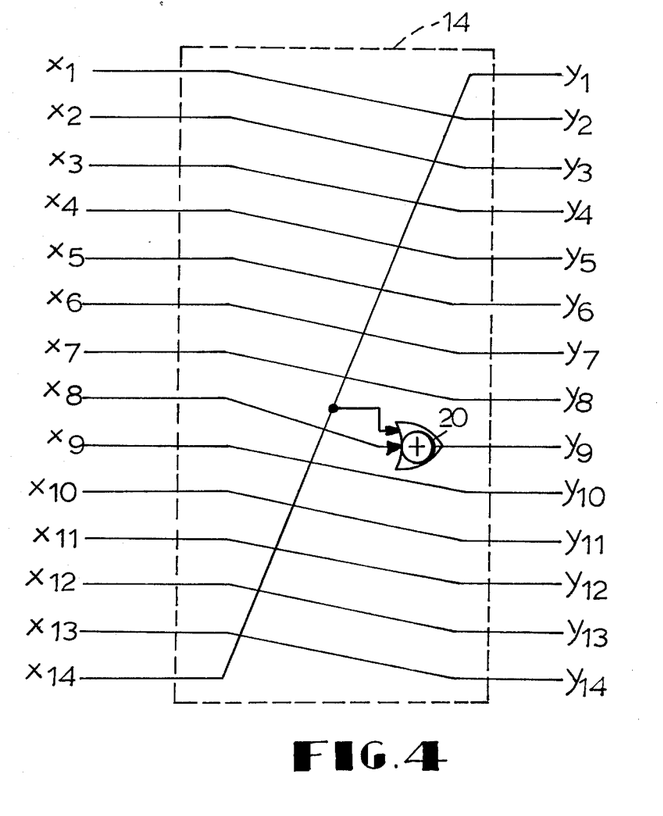
FIG. 4 shows an example of a T matrix operation circuit.

Matrix circuit 14 performs a matrix operation. A circuit composition for matrix T corresponding to the above-mentioned polynominal of $1 + x^8 + x^{14}$ is shown in FIG. 4. Thus, matrix circuit 14 can be constructed with a single 2-input exclusive OR circuit 20.

The above data and the P and Q codes are recorded by converting their arrangement onto the time axis and converting them into a form of television signal by adding one CRC per eight data words. The recording method is well known and therefore not described here.

The reproduction processes of the above-mentioned codes are described in the following.

It is clear that when one of the data words in one data set has been subjected to error, it can be corrected by means of the P code. When two of the data words in one data set are subjected to errors, assuming that i-th order data word $W_i$ and j-th order data word $W_j$ are subjected to errors and denoting the respective error patterns by $e_i$ and $e_j$, the following equations can be written.

$$P \oplus \sum_{n=1}^{6} W_n = e_i \oplus e_j \tag{5}$$

$$Q \oplus \sum_{n=1}^{6} T^{7-n} W_n = T^{7-i} e_i \oplus T^{7-j} e_j \tag{6}$$

Thus the result is not equal to 0. Denoting the right-hand terms of the above equations by $S_1$ and $S_2$ respectively, the following equations can be written:

$$S_1 = e_i \oplus e_j \tag{7}$$

$$S_2 = T^{7-i} e_i \oplus T^{7-j} e_j \tag{8}$$

Solving the above equations for $e_i$ and $e_j$, the following equations are yielded:

$$e_j = (I \oplus T^{i-j})^{-1} (S_1 \oplus T^{i-7} S_2) \tag{9}$$

$$e_i = S_1 \oplus e_j \tag{10}$$

Where I denotes a unit matrix. In order for the above equation to be solvable, it is a prerequisite that matrices $T^{-1}$-$T^{-6}$ and matrices $(1+T^{-1})^{-1}$-$(1+T^{-5})^{-1}$ exist.

Assuming K as expressed by equation (11) and $M_K$ as expressed by equation (12), equations (9) and (10) can be written as equations (13) and (14).

$$K = i - j \tag{11}$$

$$M_K = (1 \oplus T^K)^{-1} \tag{12}$$

$$e_j = M_K(S_i \oplus T^{i-7}S_2) \quad (13)$$

$$e_i = S_i \oplus e_j \quad (14)$$

As error patterns $e_i$ and $e_j$ can be calculated with equations (13) and (14), the corrective operations can be done even when the two data words have been subjected to errors.

Another possible pattern of double errors is that one of the data words and one of the P or Q codes have been subjected to errors. In this case, as viewed from the standpoint of the check code (which has not been subjected to error) and the data, the error state is a single error and the correction operation can be done by means of the check code which has not been subjected to error.

Figure 5:
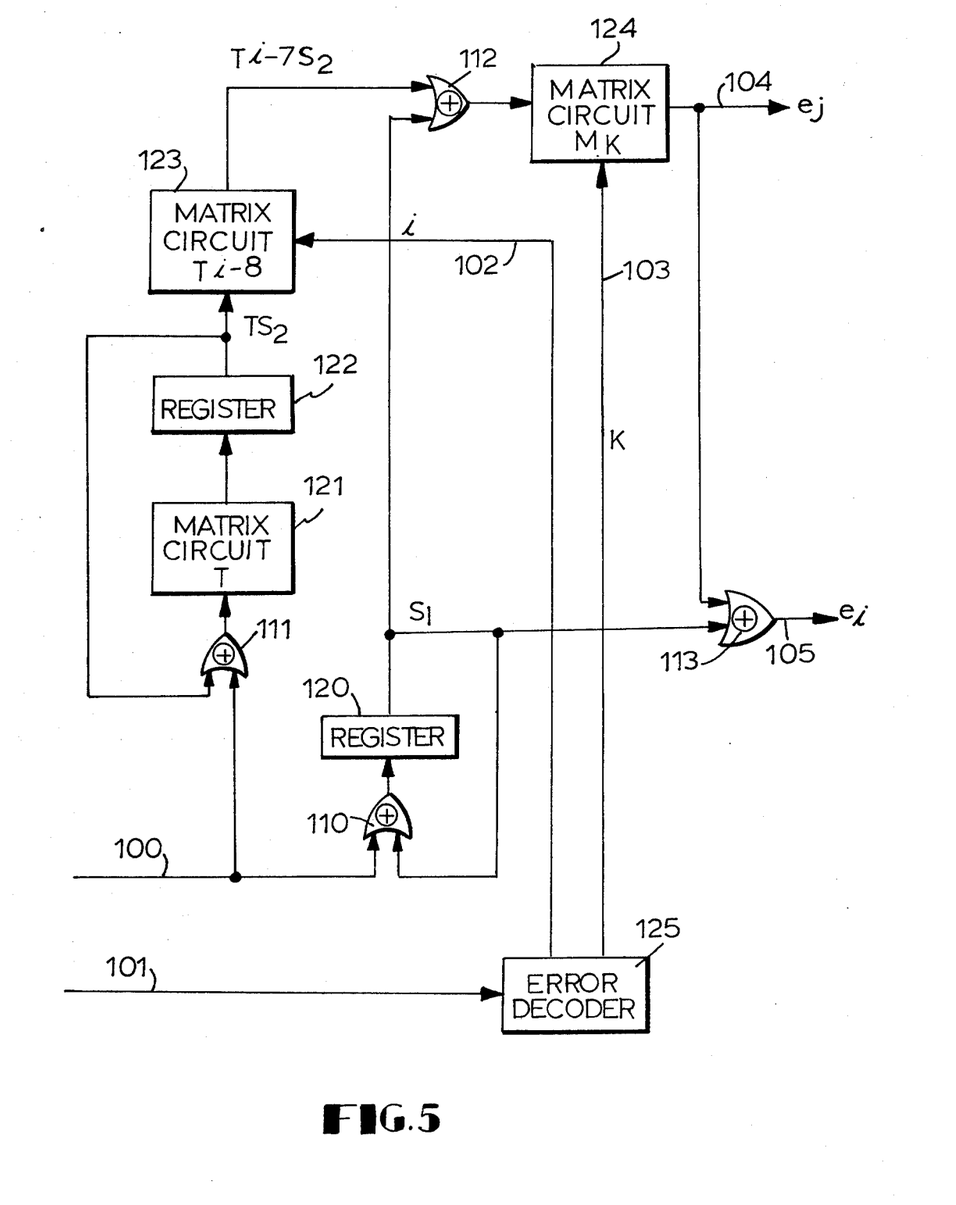
FIG. 5 shows an example of construction of a signal reproduction circuit which can be used in relation to this invention.

As explained in the above, the codes have a function of correcting errors of any two words of the data. In this case a pointer which indicates the error address is required. The afore-mentioned CRC has this function. An example of a signal reproduction circuit feasible with this invention is shown in FIG. 5.

To input line 100, one set of data words $W_1, W_2, W_3, W_4, W_5, W_6$, and P and Q are sequentially applied after being reproduced and de-interleaved. To input line 101, respective data and the result of the check of CRC of H, to which the check code belongs, is input.

Syndrome $S_1$ is expressed as follows:

$$S_1 = P \oplus \sum_{n=1}^{6} W_n \quad (15)$$

Therefore, syndrome $S_1$ can be produced by performing modulo 2 operation sequentially on data words $W_1$-$W_6$ and P code with register 120 exclusive OR circuit 110. Syndrome $S_2$, on the other hand, can be produced with exclusive OR circuit 111, matrix circuit 121 and register 122 in a manner similar to when creating the Q code. Syndrome $S_2$ is expressed as follows:

$$S_2 = Q \oplus \sum_{n=1}^{6} T^{7-n} W_n \quad (16)$$

Because register 122 performs operation on matrix T even when the Q code is input, the result becomes as follows:

$$T \cdot \left( Q \oplus \sum_{n=1}^{6} T^{7-n} W_n \right) = TS_2 \quad (17)$$

Due to the above, first matrix circuit 123 is designed so that the data is multiplied by $T^{-1}$ as an extra factor.

Error decoder 125 outputs, based on the results of the CRC check on data which are sequentially input, the initial error data No. i to the first matrix and K (where $K = i - j$), which represents the difference between two error data, to second matrix circuit 124. The first matrix circuit performs the multiplication operation of the output of register 122 by $T^{i-8}$. As a result, $T^{i-7}S_2$ is output to exclusive OR circuit 112. Exclusive OR circuit 112 performs modulo 2 addition operation on $T^{i-7}S_2$ and the contents of register 120 and sends the result of the calculation to second matrix circuit 124.

Second matrix circuit 124, based on difference K between the two errors output from error decoder 125 performs operation on $M_K$ matrix for $(S_1 \oplus T^{i-7}S_2)$ and delivers its output as error pattern $e_j$.

On the other hand, exclusive OR circuit 113 performs modulo 2 operation on syndrome $S_1$ and error pattern $e_j$, thereby producing the other error pattern $e_i$. When error patterns are as defined above, the errors are corrected and the correct data is obtained by performing modulo 2 addition operation of the error patterns to the data which has been subjected to errors.

Figure 6:
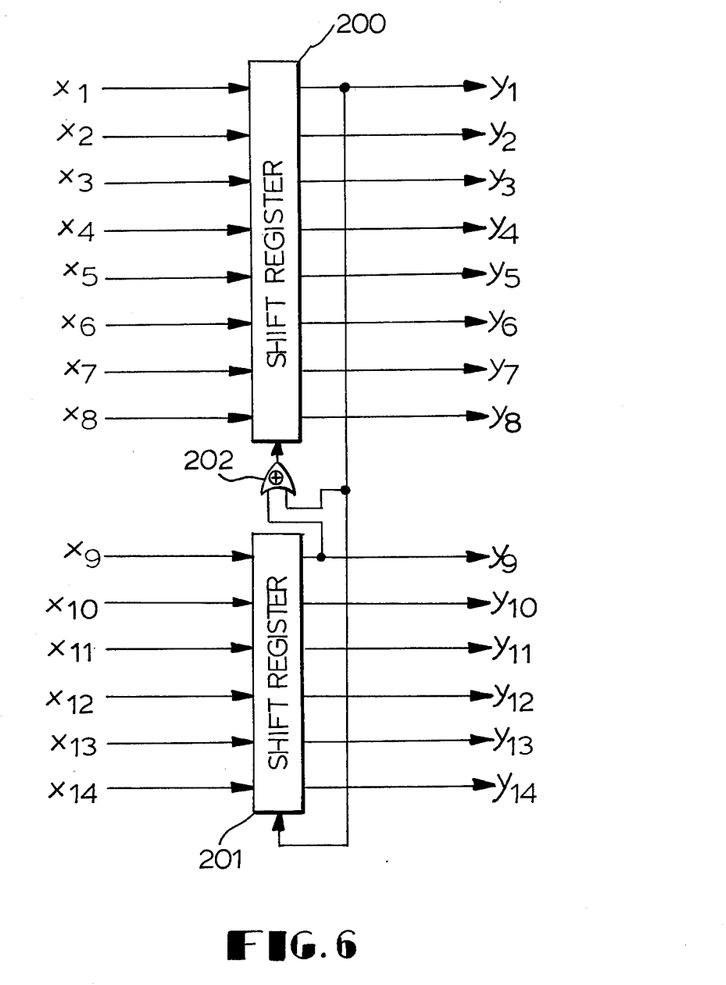
FIG. 6 shows an example of construction of a linear type shift register circuit for $T^{i-7}$ operation.

First matrix circuit 123 performs matrix operation on $T^{-2}$-$T^{-7}$ based on the value of i. This operation is performed by a linear shift register. An example of circuit construction of a shift register is shown in FIG. 6. This shift register has the reverse connections to that for polynomial $x^{14} + x^8 + 1$ and, after inputting the data of $x_1$-$x_{14}$ to 8-bit parallel shift register 200 and 6-bit parallel loaded shift register 201, is shifted by one shift serially so that the contents of the shift register become the result of $T^{-1}$ operation.

Item 202 is an exclusive OR circuit. When this circuit shifts $i-8$ times, the result is the same as the $T^{i-8}$ operation which has been done and the result is expressed as follows.

$$Y = T^{i-8}x \quad (18)$$

Of matrix $M_K$ processed by second matrix circuit 124, there are four types of matrices, $M_1$-$M_5$. The contents of these matrices are shown in Table 3.

Second matrix circuit 124 performs matrix operation on these matrices in response to the value of K. If all matrix operations are to be performed by an ROM (read only memory), the required capacity of the ROM is as follows:

$$2^{14} \times 14 \times 5 = 1146880 \text{(bits)} \quad (19)$$

Figure 7:
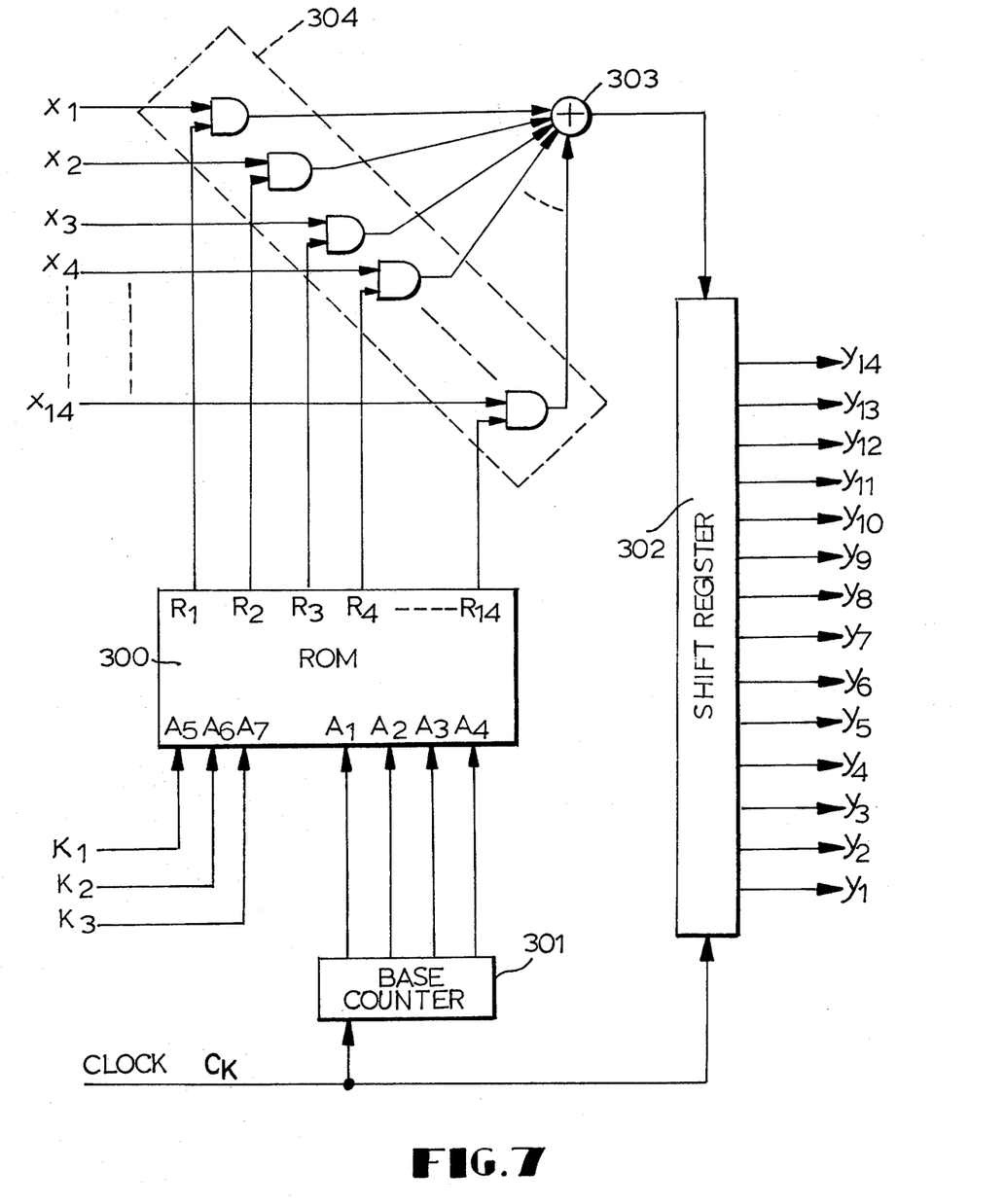
FIG. 7 shows an example of an M matrix operation circuit.

With the example shown in FIG. 7, the matrix operation is performed in the column direction so that hardware is simplified. The required capacity of the ROM in this case is 980 bits.

Judgement of which one of $M_1$-$M_5$ matrices is to be performed is done by referring to difference K ($K = i - j$) of two error data. In the example shown in FIG. 5, the value is provided with three bits of $K_1, K_2$ and $K_3$. The values for one column of given matrix M are provided with 14 bits of $R_1$-$R_{14}$. Designation of column is done by the output of 14-base counter 301, which is driven by clock CK, and the data is sent to address designation $A_1$-$A_4$ of ROM 300.

Input $X(x_1$-$x_{14})$ is multiplied by one column of data $R_1$-$R_{14}$ (which is output from ROM 300) of M matrix for each bit by AND array 304, it is subject to modulo 2 addition operation by the modulo 2 adder 304 and becomes a 1-bit signal. Then it is fed to serial input parallel output shift register 302 which is driven by clock CK. The M matrix is operated column by column and fourteen operations are done to complete processing for it. Thus, the operation time of the M matrix is 14-clock time or over.

As described in the above, the codes used relating to this invention can be easily generated and reproduced. They have a high correcting function so that errors of any two data in one data set can be corrected.

Construction of the generating circuit and reproducing circuit are largely affected by the T matrix used. As for the T matrix, any type of matrix can be used, as long as the M matrix to be processed when reproducing exists. Yet it is most desirable to use a matrix which makes the operation of matrix T or $T^{-1}$ easier. From this viewpoint a matrix which corresponds to the following polynomial is used:

$$1+x^8+x^{14} \tag{20}$$

A matrix for a general matrix of formula (20) is written as follows:

$$g_0 + \sum_{n=1}^{14} g_n x^n \tag{16}$$

$$T = \begin{pmatrix} 0 & 0 & 0 & 0 & 0 & 0 & 0 & 0 & 0 & 0 & 0 & 0 & 0 & g_0 \\ 1 & 0 & 0 & 0 & 0 & 0 & 0 & 0 & 0 & 0 & 0 & 0 & 0 & g_1 \\ 0 & 1 & 0 & 0 & 0 & 0 & 0 & 0 & 0 & 0 & 0 & 0 & 0 & g_2 \\ 0 & 0 & 1 & 0 & 0 & 0 & 0 & 0 & 0 & 0 & 0 & 0 & 0 & g_3 \\ 0 & 0 & 0 & 1 & 0 & 0 & 0 & 0 & 0 & 0 & 0 & 0 & 0 & g_4 \\ 0 & 0 & 0 & 0 & 1 & 0 & 0 & 0 & 0 & 0 & 0 & 0 & 0 & g_5 \\ 0 & 0 & 0 & 0 & 0 & 1 & 0 & 0 & 0 & 0 & 0 & 0 & 0 & g_6 \\ 0 & 0 & 0 & 0 & 0 & 0 & 1 & 0 & 0 & 0 & 0 & 0 & 0 & g_7 \\ 0 & 0 & 0 & 0 & 0 & 0 & 0 & 1 & 0 & 0 & 0 & 0 & 0 & g_8 \\ 0 & 0 & 0 & 0 & 0 & 0 & 0 & 0 & 1 & 0 & 0 & 0 & 0 & g_9 \\ 0 & 0 & 0 & 0 & 0 & 0 & 0 & 0 & 0 & 1 & 0 & 0 & 0 & g_{10} \\ 0 & 0 & 0 & 0 & 0 & 0 & 0 & 0 & 0 & 0 & 1 & 0 & 0 & g_{11} \\ 0 & 0 & 0 & 0 & 0 & 0 & 0 & 0 & 0 & 0 & 0 & 1 & 0 & g_{12} \\ 0 & 0 & 0 & 0 & 0 & 0 & 0 & 0 & 0 & 0 & 0 & 0 & 1 & g_{13} \end{pmatrix}$$

While $g_0$ is constantly 1, the number of 1's in $g_1$–$g_{13}$ depends on the number of exclusive OR's in the T matrix operation circuit. It is more desirable that the number of 1's is smaller. It is ideal that only one of $g_1$–$g_{13}$ is "1" and all the others are "0". This state corresponds to the following prenomial:

$$1+x^n+x^{14} \tag{22}$$

The inventors calculated the existence of $M_1$–$M_5$ matrices with n for 1–13 and found the existence of the following eight polynomials:

$$1+x^2+x^{14} \tag{23a}$$

$$1+x^3+x^{14} \tag{23b}$$

$$1+x^5+x^{14} \tag{23c}$$

$$1+x^6+x^{14} \tag{23d}$$

$$1+x^8+x^{14} \tag{23e}$$

$$1+x^9+x^{14} \tag{23f}$$

$$1+x^{11}+x^{14} \tag{23g}$$

$$1+x^{12}+x^{14} \tag{23h}$$

Any one of the above eight polynomials can be used. Because most TTL's and other standard IC's are of 8-bit construction, the following polynomial was selected for this sample of equipment for the invention.

$$1+x^8+x^{14}$$

Figure 8:
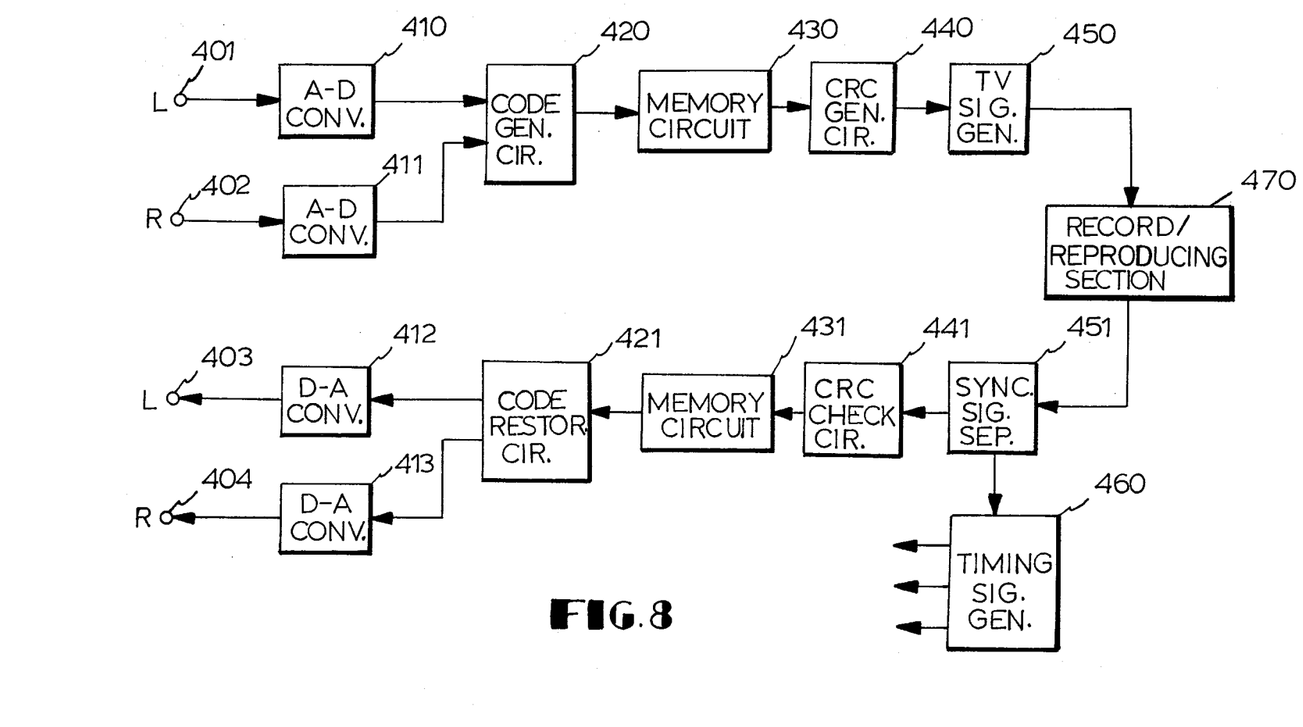
FIG. 8 shows a block diagram of the PCM recorder as an example of the use of this invention.

The construction of the PCM recorder as an example of use of this invention with the above codes is shown in FIG. 8. Referring to FIG. 8, the right (R) and left (L) stereophonic signals supplied to input terminals 401 and 402 are converted into digital signals by A-D converters (analog-to-digital converters) 410 and 411 and then the signals are fed to PQ code generator circuit 420.

PQ code generator circuit 420 (with three R channels of sample data closely positioned timewise, and three R channels, or a total of six channels as one set) generates both P and Q codes which are sent to memory circuit 430, which performs the interleaving operation. The data, interleaved by memory circuit 430, is fed to the CRC generator circuit, which produces one CRC code per eight codes and data of different sets so that the CRC code is added, is converted into television format signals by the television signal generator circuit 450, and then is recorded on magnetic tape by the rotary heads of recording/reproducing section 470. As for recording/reproducing section 470, conventional helical scanning type 2-head system record/playback equipment can be used.

For playback, on the other hand, the signal reproduced from the magnetic tape (the signal which is similar to television signal in identical form with said record signal as when it was recorded) is subjected to synchronization signal separation by synchronization signal separator circuit 451 and fed to timing signal generator circuit 460 which generates a timing signal for driving the playback circuits.

The signal conditioned as above is checked by CRC check circuit 441 to see if it was subjected to any error when in the recording operation. Then the signal, together with the signal representing the result of the check, is fed to memory circuit 431 and is de-interleaved, restoring a sampling time sequence the same as that of the input stereo signals. The output signal of memory circuit 431, fed to P Q code restoration circuit 421, is subjected to error correction sequentially for each set of signals, and is separated into L and R channel signals. These signals are converted back into the original analog signals by D-A converters 412 and 413. The resultant analog signals are fed to output terminals 403 and 404.

In general, when signals are recorded on magnetic tape with rotary heads, most code errors are caused by drop out. The error factor is in the order of $10^{-3}$–$10^{-6}$ in CRC units. Errors caused by drop out are often synchronous errors and cannot be effectively detected by addition of a single CRC signal for each synchronization signal, because CRC checking only detects the creation of errors.

When a cyclic redundancy check code is used for error detection only, although drop out errors and other burst states are overlooked by a probability of $2^{-16}$, all other errors can be detected. With the PCM tape recorder used in this example, even when data is recorded on tape which has an error factor of $10^{-3}$, the overlooked rate is less than one overlooked error per hour. The probability of 3H or over of errors within 8H, which includes one set of data, is approximately 21 $P_H3$, where $P_H$ denotes the probability of H errors. The probability of errors which cannot be corrected by the use of these codes is approximately one error per hour, which is roughly equal to errors overlooked by CRC checking. Thus, the error correction factor is as high as that of overlook in CRC detection.

The codes used in this invention have a capability of single-error correction without being supported by the CRC error detection function. In such cases, error correction is done in the manner described in the following:

Assume that $W_i$ from data $W_1$–$W_6$ is subjected to an error. The error pattern ($e_i$) in this case can be expressed as follows:

$$p + \sum_{n=1}^{6} W_K = S_1 = e_i \qquad (24)$$

$$Q + \sum_{n=1}^{6} T^{7-n} W_n = S_2 = T^{7-i} e_i \qquad (25)$$

Therefore, the relationship between $S_1$ and $S_2$ can be expressed as follows:

$$S_1 = T^{i-7} S_2 \qquad (26)$$

Due to the above relationship, the erroneous data can be located by multiplying $S_2$ by factor of $T^{-1}$ until the value conforms with $S_1$ and, thus, correction can be done by means of $S_1$.

A disadvantage of this method is that the signal reproduction circuit becomes slightly sophisticated. However, when error overlook by CRC check is unallowable, this method may be used in conjunction. This method prevents errors caused by overlook by CRC check and improves the correction factor by the order of one or over.

As is apparent from the above description, this invention enables realization of signal processing apparatus of high error correction capability, with simple circuitry for signal reproduction, by using a CRC circuit which has high error correction capability exclusively for error correction. This makes location of error addresses easier. This invention also uses the P and Q codes as error correction codes for correction of up to two errors. This invention is especially applicable to PCM tape recorders which perform basically word-unit processes by making the bit construction of the words which generate codes conform with the bit number of the sampled data.

TABLE 1

| P = W₁ | ⊕W₂ | ⊕W₃ | ⊕W₄ | ⊕W₅ | ⊕W₆ |
|---|---|---|---|---|---|
| $p_1 = a_1$ | $\oplus b_1$ | $\oplus c_1$ | $\oplus d_1$ | $\oplus e_1$ | $\oplus f_1$ |
| $p_1 = a_2$ | $\oplus b_2$ | $\oplus c_2$ | $\oplus d_2$ | $\oplus e_2$ | $\oplus f_2$ |
| $p_3 = a_3$ | $\oplus b_3$ | $\oplus c_3$ | $\oplus d_3$ | $\oplus e_3$ | $\oplus f_3$ |
| $p_4 = a_4$ | $\oplus b_4$ | $\oplus c_4$ | $\oplus d_4$ | $\oplus e_4$ | $\oplus f_4$ |
| $p_5 = a_5$ | $\oplus b_5$ | $\oplus c_5$ | $\oplus d_5$ | $\oplus e_5$ | $\oplus f_5$ |
| $p_6 = a_6$ | $\oplus b_6$ | $\oplus c_6$ | $\oplus d_6$ | $\oplus e_6$ | $\oplus f_6$ |
| $p_7 = a_7$ | $\oplus b_7$ | $\oplus c_7$ | $\oplus d_7$ | $\oplus e_7$ | $\oplus f_7$ |
| $p_8 = a_8$ | $\oplus b_8$ | $\oplus c_8$ | $\oplus d_8$ | $\oplus e_8$ | $\oplus f_8$ |
| $p_9 = a_9$ | $\oplus b_9$ | $\oplus c_9$ | $\oplus d_9$ | $\oplus e_9$ | $\oplus f_9$ |
| $p_{10} = a_{10}$ | $\oplus b_{10}$ | $\oplus c_{10}$ | $\oplus d_{10}$ | $\oplus e_{10}$ | $\oplus f_{10}$ |
| $p_{11} = a_{11}$ | $\oplus b_{11}$ | $\oplus c_{11}$ | $\oplus d_{11}$ | $\oplus e_{11}$ | $\oplus f_{11}$ |
| $p_{12} = a_{12}$ | $\oplus b_{12}$ | $\oplus c_{12}$ | $\oplus d_{12}$ | $\oplus e_{12}$ | $\oplus f_{12}$ |
| $p_{13} = a_{13}$ | $\oplus b_{13}$ | $\oplus c_{13}$ | $\oplus d_{13}$ | $\oplus e_{13}$ | $\oplus f_{13}$ |
| $p_{14} = a_{14}$ | $\oplus b_{14}$ | $\oplus c_{14}$ | $\oplus d_{14}$ | $\oplus e_{14}$ | $\oplus f_{14}$ |

TABLE 2

| $Q = T^6 W_1$ ⊕ | $T^5 W_2$ ⊕ | $T^4 W_3$ ⊕ | $T^3 W_4$ ⊕ | $T^2 W_5$ ⊕ | $T W_6$ |
|---|---|---|---|---|---|
| $q_1 = a_7$ ⊕ $a_1$ | $\oplus b_6$ ⊕ | $c_5$ ⊕ | $d_4$ ⊕ | $e_3$ ⊕ | $f_2$ |
| $q_2 = a_8$ ⊕ $a_2$ | $\oplus b_7$ ⊕ $b_1$ | $\oplus c_6$ ⊕ | $d_5$ ⊕ | $e_4$ ⊕ | $f_3$ |
| $q_3 = a_9$ ⊕ $a_3$ | $\oplus b_8$ ⊕ $b_2$ | $\oplus c_7$ ⊕ $c_1$ | $\oplus d_6$ ⊕ | $e_5$ ⊕ | $f_4$ |
| $q_4 = a_{10}$ ⊕ $a_4$ | $\oplus b_9$ ⊕ $b_3$ | $\oplus c_8$ ⊕ $c_2$ | $\oplus d_7$ ⊕ $d_1 \oplus e_6$ | ⊕ | $f_5$ |
| $q_5 = a_{11}$ ⊕ $a_5$ | $\oplus b_{10}$ ⊕ $b_4$ | $\oplus c_9$ ⊕ $c_3$ | $\oplus d_8$ ⊕ $d_2 \oplus e_7$ | $\oplus e_1$ | $\oplus f_6$ |
| $q_6 = a_{12}$ ⊕ $a_6$ | $\oplus b_{11}$ ⊕ $b_5$ | $\oplus c_{10}$ ⊕ $c_4$ | $\oplus d_9$ ⊕ $d_3 \oplus e_8$ | $\oplus e_2$ | $\oplus f_7$ ⊕ $f_1$ |
| $q_7 = a_{13}$ ⊕ | $b_{12}$ ⊕ | $c_{11}$ ⊕ | $d_{10}$ ⊕ | $e_9$ ⊕ | $f_8$ |
| $q_8 = a_{14}$ ⊕ | $b_{13}$ ⊕ | $c_{12}$ ⊕ | $d_{11}$ ⊕ | $e_{10}$ ⊕ | $f_9$ |
| $q_9 = a_1$ ⊕ | $b_{14}$ ⊕ | $c_{13}$ ⊕ | $d_{12}$ ⊕ | $e_{11}$ ⊕ | $f_{10}$ |
| $q_{10} = a_2$ ⊕ | $b_1$ ⊕ | $c_{14}$ ⊕ | $d_{13}$ ⊕ | $e_{12}$ ⊕ | $f_{11}$ |
| $q_{11} = a_3$ ⊕ | $b_2$ ⊕ | $c_1$ ⊕ | $d_{14}$ ⊕ | $e_{13}$ ⊕ | $f_{12}$ |
| $q_{12} = a_4$ ⊕ | $b_3$ ⊕ | $c_2$ ⊕ | $d_1$ ⊕ | $e_{14}$ ⊕ | $f_{13}$ |
| $q_{13} = a_5$ ⊕ | $b_4$ ⊕ | $c_3$ ⊕ | $d_2$ ⊕ | $e_1$ ⊕ | $f_{14}$ |
| $q_{14} = a_6$ ⊕ | $b_5$ ⊕ | $c_4$ ⊕ | $d_3$ ⊕ | $e_2$ ⊕ | $f_1$ |

TABLE 3

$$M_1 = \begin{pmatrix} 1 & 1 & 1 & 1 & 1 & 1 & 1 & 1 & 1 & 1 & 1 & 1 & 1 & 1 \\ 0 & 1 & 1 & 1 & 1 & 1 & 1 & 1 & 1 & 1 & 1 & 1 & 1 & 1 \\ 0 & 0 & 1 & 1 & 1 & 1 & 1 & 1 & 1 & 1 & 1 & 1 & 1 & 1 \\ 0 & 0 & 0 & 1 & 1 & 1 & 1 & 1 & 1 & 1 & 1 & 1 & 1 & 1 \\ 0 & 0 & 0 & 0 & 1 & 1 & 1 & 1 & 1 & 1 & 1 & 1 & 1 & 1 \\ 0 & 0 & 0 & 0 & 0 & 1 & 1 & 1 & 1 & 1 & 1 & 1 & 1 & 1 \\ 0 & 0 & 0 & 0 & 0 & 0 & 1 & 1 & 1 & 1 & 1 & 1 & 1 & 1 \\ 0 & 0 & 0 & 0 & 0 & 0 & 0 & 1 & 1 & 1 & 1 & 1 & 1 & 1 \\ 1 & 1 & 1 & 1 & 1 & 1 & 1 & 1 & 0 & 0 & 0 & 0 & 0 & 0 \\ 1 & 1 & 1 & 1 & 1 & 1 & 1 & 1 & 1 & 0 & 0 & 0 & 0 & 0 \\ 1 & 1 & 1 & 1 & 1 & 1 & 1 & 1 & 1 & 1 & 0 & 0 & 0 & 0 \\ 1 & 1 & 1 & 1 & 1 & 1 & 1 & 1 & 1 & 1 & 1 & 0 & 0 & 0 \\ 1 & 1 & 1 & 1 & 1 & 1 & 1 & 1 & 1 & 1 & 1 & 1 & 0 & 0 \\ 1 & 1 & 1 & 1 & 1 & 1 & 1 & 1 & 1 & 1 & 1 & 1 & 1 & 0 \end{pmatrix}$$

$$M_2 = \begin{pmatrix} 1 & 0 & 1 & 0 & 1 & 0 & 1 & 0 & 1 & 0 & 1 & 0 & 1 & 0 \\ 0 & 1 & 0 & 1 & 0 & 1 & 0 & 1 & 0 & 1 & 0 & 1 & 0 & 1 \\ 0 & 0 & 1 & 0 & 1 & 0 & 1 & 0 & 1 & 0 & 1 & 0 & 1 & 0 \\ 0 & 0 & 0 & 1 & 0 & 1 & 0 & 1 & 0 & 1 & 0 & 1 & 0 & 1 \\ 0 & 0 & 0 & 0 & 1 & 0 & 1 & 0 & 1 & 0 & 1 & 0 & 1 & 0 \\ 0 & 0 & 0 & 0 & 0 & 1 & 0 & 1 & 0 & 1 & 0 & 1 & 0 & 1 \\ 0 & 0 & 0 & 0 & 0 & 0 & 1 & 0 & 1 & 0 & 1 & 0 & 1 & 0 \\ 0 & 0 & 0 & 0 & 0 & 0 & 0 & 1 & 0 & 1 & 0 & 1 & 0 & 1 \\ 1 & 0 & 1 & 0 & 1 & 0 & 1 & 0 & 0 & 0 & 0 & 0 & 0 & 0 \\ 0 & 1 & 0 & 1 & 0 & 1 & 0 & 1 & 0 & 0 & 0 & 0 & 0 & 0 \\ 1 & 0 & 1 & 0 & 1 & 0 & 1 & 0 & 1 & 0 & 0 & 0 & 0 & 0 \\ 0 & 1 & 0 & 1 & 0 & 1 & 0 & 1 & 0 & 1 & 0 & 0 & 0 & 0 \\ 1 & 0 & 1 & 0 & 1 & 0 & 1 & 0 & 1 & 0 & 1 & 0 & 0 & 0 \\ 0 & 1 & 0 & 1 & 0 & 1 & 0 & 1 & 0 & 1 & 0 & 1 & 0 & 0 \end{pmatrix}$$

$$M_3 = \begin{pmatrix} 1 & 0 & 0 & 1 & 0 & 0 & 1 & 0 & 0 & 1 & 0 & 0 & 1 & 0 \\ 0 & 1 & 0 & 0 & 1 & 0 & 0 & 1 & 0 & 0 & 1 & 0 & 0 & 1 \\ 0 & 0 & 1 & 0 & 0 & 1 & 0 & 0 & 1 & 0 & 0 & 1 & 0 & 0 \\ 0 & 0 & 0 & 1 & 0 & 0 & 1 & 0 & 0 & 1 & 0 & 0 & 1 & 0 \\ 0 & 0 & 0 & 0 & 1 & 0 & 0 & 1 & 0 & 0 & 1 & 0 & 0 & 1 \\ 0 & 0 & 0 & 0 & 0 & 1 & 0 & 0 & 1 & 0 & 0 & 1 & 0 & 0 \\ 0 & 0 & 0 & 0 & 0 & 0 & 1 & 0 & 0 & 1 & 0 & 0 & 1 & 0 \\ 0 & 0 & 0 & 0 & 0 & 0 & 0 & 1 & 0 & 0 & 1 & 0 & 0 & 1 \\ 1 & 0 & 0 & 1 & 0 & 0 & 1 & 0 & 1 & 1 & 0 & 1 & 1 & 0 \\ 0 & 1 & 0 & 0 & 1 & 0 & 0 & 1 & 0 & 1 & 1 & 0 & 1 & 1 \\ 0 & 0 & 1 & 0 & 0 & 1 & 0 & 0 & 1 & 0 & 1 & 1 & 0 & 1 \\ 1 & 0 & 0 & 1 & 0 & 0 & 1 & 0 & 0 & 1 & 1 & 0 & 1 & 0 \\ 0 & 1 & 0 & 0 & 1 & 0 & 0 & 1 & 0 & 0 & 1 & 1 & 0 & 1 \\ 0 & 0 & 1 & 0 & 0 & 1 & 0 & 0 & 1 & 0 & 0 & 1 & 0 & 1 \end{pmatrix}$$

TABLE 3-continued $$M_4 = \begin{pmatrix} 0&0&1&0&0&0&1&0&0&0&1&0&0&0 \\ 0&0&0&1&0&0&0&1&0&0&0&1&0&0 \\ 1&0&0&0&1&0&0&0&1&0&0&0&1&0 \\ 0&1&0&0&0&1&0&0&0&1&0&0&0&1 \\ 1&0&1&0&0&0&1&0&0&0&1&0&0&0 \\ 0&1&0&1&0&0&0&1&0&0&0&1&0&0 \\ 1&0&1&0&1&0&0&0&1&0&0&0&1&0 \\ 0&1&0&1&0&1&0&0&0&1&0&0&0&1 \\ 1&0&0&0&1&0&0&0&0&0&0&0&0&0 \\ 0&1&0&0&0&1&0&0&0&0&0&0&0&0 \\ 0&0&1&0&0&0&1&0&0&0&0&0&0&0 \\ 0&0&0&1&0&0&0&1&0&0&0&0&0&0 \\ 1&0&0&0&1&0&0&0&1&0&0&0&0&0 \\ 0&1&0&0&0&1&0&0&0&1&0&0&0&0 \end{pmatrix}$$

$$M_5 = \begin{pmatrix} 0&1&1&0&1&0&1&1&0&1&0&1&1&0 \\ 1&0&1&1&0&1&0&1&1&0&1&0&1&1 \\ 0&1&0&1&1&0&1&0&1&1&0&1&0&1 \\ 1&0&1&0&1&1&0&1&0&1&1&0&1&0 \\ 1&1&0&1&0&1&1&0&1&0&1&1&0&1 \\ 1&1&1&0&1&0&1&1&0&1&0&1&1&0 \\ 1&1&1&1&0&1&0&1&1&0&1&0&1&1 \\ 0&1&1&1&1&0&1&0&1&1&0&1&0&1 \\ 1&1&0&1&0&1&1&0&0&0&1&1&0&0 \\ 0&1&1&0&1&0&1&1&0&0&0&1&1&0 \\ 1&0&1&1&0&1&0&1&1&0&0&0&1&1 \\ 0&1&0&1&1&0&1&0&1&1&0&0&0&1 \\ 1&0&1&0&1&1&0&1&0&1&1&0&0&0 \\ 1&1&0&1&0&1&1&0&1&0&1&1&0&0 \end{pmatrix}$$

What is claimed is:

1. A digital signal processor for use in recording equipment which converts an analog signal into a pulse-code modulation signal and records said pulse-code modulation signal, said processor comprising:

a data input terminal to which are inputted a plurality of data words, composing a series of data sets, each data set being composed of K data words (K denotes an integer), each data word being composed of G data bits (G denotes an integer);

a first check code generating means coupled to said data input terminal for generating in each data set a G bit first check code by combining corresponding bits of all positions of respective data words in each data set via a modulo 2 summation expressed as:

$$\sum_{i=1}^{K} W_i = (w_{11} \oplus w_{21} \oplus \ldots \oplus w_{k1}, w_{12} \oplus w_{22} \oplus \ldots \oplus w_{k2},$$

$$\ldots, w_{1G} \oplus w_{2G} \oplus \ldots \oplus w_{kG})$$

where $W_i$ is said data word and $W_i = (w_{i1}, w_{i2}, \ldots, w_{iG})$, $w_{ij}$ ($j = 1, 2, \ldots, G$) is a bit of 0 or 1, and $$\sum_{i=1}^{K}$$

means the modulo 2 summation of K data words;

a second check code generating means coupled to said data input terminal for generating in each data set a G bit second check code which is the modulo 2 sum of the current word and the previous result being multiplied by matrix T to generate the current sum, said second check code being expressed as:

$$\sum_{i=1}^{k} T^{k-i+1} W_i$$

where, T is an associated matrix of a G-th order polynomial;

a memory means coupled to both said first check code generating means and said second check code generating means for (a) temporarily storing said series of data sets, corresponding first check codes and corresponding second check codes, and (b) constructing data blocks each composed of K data words, one first check code and one second check code, the first data word of said data block being the first data word of the first set of the stored data sets, the second word of said data block being the second data word of the second data set of the stored data sets, ..., the Kth data word of said data block being the Kth data word of the Kth data set of the stored data sets, said one first check code being the first check code generated from the (K+1)th data set of the stored data sets, and said one second check code being the second check code generated from the (K+2)th data set of the stored data sets; and a third check code generating means coupled to said memory means for generating from each of said data blocks a third check code which is a redundant word for error detection, said third check code being located at a position next to the second check code in said each data block on a time axis, said each data block including said third check code being said pulse-code modulation signal to be recorded.

2. A digital signal processor for use in reproducing equipment which reproduces and converts a pulse-code modulation signal into an analog signal, said processor comprising:

a data input terminal to which are inputted a plurality of data words, composing a series of data sets, each data set being composed of K data words (K denotes an integer), each data word being composed of G data bits (G denotes an integer);

a first check code generating means coupled to said data input terminal for generating in each data set a G bit first check code by combining corresponding bits of all positions of respective data words in each data set via a modulo 2 summation expressed as:

$$\sum_{i=1}^{K} W_i = (w_{11} \oplus w_{21} \oplus \ldots \oplus w_{k1}, w_{12} \oplus w_{22} \oplus \ldots \oplus w_{k2},$$

$$\ldots, w_{1G} \oplus w_{2G} \oplus \ldots \oplus w_{kG})$$

where $W_i$ is said data word and $W_i = (w_{i1}, w_{i2}, \ldots, w_{iG})$, $w_{ij}$ ($j = 1, 2, \ldots, G$) is a bit of 0 or 1, and $$\sum_{i=1}^{K}$$

means the modulo 2 summation of K data words;

a second check code generating means coupled to said data input terminal for generating in each data set a G bit second check code which is the modulo 2 sum of the current word and the previous result being multiplied by matrix T to generate the current sum, said second check code being expressed as:

$$\sum_{i=1}^{k} T^{k-i+1} W_i$$

where, T is an associated matrix of a G-th order polynomial;

a memory means coupled to both said first check code generating means and said second check code generating means for (a) temporarily storing said series of data sets, corresponding first check codes and corresponding second check codes, and (b) constructing data blocks each composed of K data words, one first check code and one second check code, the first data word of said data block being the first data word of the first data set of the stored data sets, the second word of said data block being the second data word of the second data set of the stored data sets, the Kth data word of said data block being the Kth data word of the Kth data set of the stored data sets, said one first check code being the first check code generated from the (K+1)th data set of the stored data sets, and said one second check code being the second check code generated from the (K+2)th data set of the stored data sets; and a third check code generating means coupled to said memory means for generating from each of said data blocks a third check code which is a redundant word for error detection, said third check code being located at a position next to the second check code in said each data block on a time axis, said each data block including said third check code being said pulse-code modulation signal to be recorded.

* * * * *